(12) United States Patent
Takeda et al.

(10) Patent No.: US 7,934,717 B2
(45) Date of Patent: May 3, 2011

(54) SHEET TRANSPORTING DEVICE WITH LOCKING MECHANISM

(75) Inventors: Kazuhisa Takeda, Shiojiri (JP); Masaki Shimomura, Matsumoto (JP); Masafumi Furuyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/765,256

(22) Filed: Apr. 22, 2010

(65) Prior Publication Data

US 2010/0270726 A1 Oct. 28, 2010

(30) Foreign Application Priority Data

Apr. 23, 2009 (JP) .................................. 2009-105012

(51) Int. Cl.
*B65H 5/06* (2006.01)

(52) U.S. Cl. ...... 271/4.04; 271/3.14; 271/225; 271/902; 271/186

(58) Field of Classification Search ................ 271/3.14, 271/4.04, 225, 902, 186; 399/364, 374
See application file for complete search history.

(56) References Cited

U.S. PATENT DOCUMENTS

| | | | | |
|---|---|---|---|---|
| 5,222,724 | A * | 6/1993 | Hirano et al. ................ | 271/902 |
| 7,108,368 | B2 * | 9/2006 | Saito et al. .................... | 271/186 |
| 7,212,321 | B2 | 5/2007 | Sugiyama et al. | |
| 7,374,281 | B2 * | 5/2008 | Saito et al. .................... | 271/186 |
| 2007/0069451 | A1 | 3/2007 | Iwago et al. | |
| 2007/0085258 | A1 * | 4/2007 | Iwago et al. ................ | 271/3.14 |
| 2007/0104524 | A1 | 5/2007 | Suzuki | |

FOREIGN PATENT DOCUMENTS

| | | |
|---|---|---|
| JP | 2001-354328 | 12/2001 |
| JP | 2007-091353 | 4/2007 |
| JP | 2007-131357 | 5/2007 |
| JP | 2008-068971 | 3/2008 |

* cited by examiner

*Primary Examiner* — Stefano Karmis
*Assistant Examiner* — Gerald W McClain
(74) *Attorney, Agent, or Firm* — Workman Nydegger

(57) ABSTRACT

A rotation-transmitting mechanism includes a first planetary gear mechanism and a locking mechanism. The first planetary gear mechanism transmits rotational driving force to the transportation unit through a first planet gear to rotate the transportation roller when the motor rotates in a first direction, and transmits rotational driving force to the transportation unit through a second planet gear to rotate the transportation roller when the motor rotates in a second direction. The locking mechanism can lock a planetary rocking member of the first planetary gear mechanism in such a condition that rotational driving force of the motor is transmitted to the transportation unit through the second planet gear. The locking mechanism terminates locking of the planetary rocking member of the first planetary gear mechanism by engaging with the sheet in the transportation path downstream of the transportation roller with respect to the direction in which the sheet is transported.

3 Claims, 12 Drawing Sheets

SHEET TRANSPORTING DEVICE WITH LOCKING MECHANISM

BACKGROUND

1. Technical Field

The present invention relates to a sheet transporting device, which includes a transportation roller that transports a sheet to a transportation path by rotating in a forward direction; a discharge roller that discharges the sheet in the transportation path by rotating in a forward direction and that feeds the sheet to the transportation roller via a reversing path by rotating in a reverse direction; and a motor that is a source of driving force for the transportation roller and the discharge roller.

2. Related Art

Image reading apparatuses having an automatic document feeder, which is an example of a sheet transporting device, are known, such as copiers, facsimiles, and scanners. A known automatic document feeder that is provided in such image reading apparatuses transports a document sheet to a transportation path in which an image reading unit is provided. Thereafter, when the document sheet comes to the position where the document sheet can be discharged, the document sheet is reversely fed through a reversing path by using a switching-back structure. Thus, the document sheet is turned upside down and again transported to the position where the image reading is performed. For example, see JP-A-2001-354328. By providing such an automatic document feeder in a copier, a facsimile, a scanner, or the like, both sides of the document sheet can be automatically read. Moreover, recording apparatuses such as printers capable of performing automatic duplex printing are examples of known electronic apparatuses provided with a sheet transporting device using a similar switching-back structure.

In the above-described automatic document feeder, when the document sheet is transported in the direction of transportation, transportation rollers (for example, a pair of registration rollers in JP-A-2001-354328) and discharge rollers (for example, a pair of discharge rollers in JP-A-2001-354328) are rotated in forward directions.

When the document sheet is switched back, the discharge rollers are rotated in a reverse direction. The document sheet that is reversely fed to the reversing path has been turned upside down, and is nipped between the transportation rollers for a second time. From this time, at least until the document sheet passes the discharge rollers, it is necessary either to continue the rotation of the discharge rollers in the reverse direction or to release the driven roller of the discharge rollers by using a release mechanism that is actuated by a solenoid or the like, while keeping the rotation of the transportation rollers in the forward direction.

Furthermore, in order to remove skew of the document sheet by using the transportation rollers, it is necessary to temporarily stop the rotation of the transportation rollers only, temporarily reverse the direction of rotation of the transportation rollers, or the like. By such an operation, the attitude of the document sheet relative to the direction of transportation is corrected and the skew of the document sheet relative to the direction of transportation is removed. In image reading apparatuses having an automatic document feeder, such a skew-removing operation is necessary in order to achieve high accuracy of reading, because there may be a relatively large skew when the back side of the document sheet is read after the document sheet is reversed.

For the reasons described above, a known automatic document feeder has a plurality of motors as the source of driving force, and as a result, the cost thereof increases.

SUMMARY

An advantage of some aspects of the invention is that a sheet transporting device which can automatically reverse a sheet is achieved at low cost.

According to an aspect of the invention, a sheet transporting device is provided. The sheet transporting device includes a transportation roller, a discharge roller, a motor, a first rotation-transmitting mechanism, and a second rotation-transmitting mechanism. The transportation roller transports a sheet to a transportation path by rotating in a forward direction. The discharge roller discharges the sheet from the transportation path by rotating in a forward direction, and feeds the sheet to the transportation roller through a reversing path by rotating in a reverse direction. The motor serves as the source of driving force for the transportation roller and the discharge roller. The first rotation-transmitting mechanism transmits rotational driving force of the motor to the transportation roller. The second rotation-transmitting mechanism transmits rotational driving force of the motor to the discharge roller. The first rotation-transmitting mechanism includes a first planetary gear mechanism and a locking mechanism. The first planetary gear mechanism transmits rotational driving force to the transportation roller through a first planet gear to rotate the transportation roller in the forward direction when the motor rotates in a first direction. The first planetary gear mechanism transmits rotational driving force to the transportation roller through a second planet gear to rotate the transportation roller in the forward direction when the motor rotates in a second direction. The locking mechanism can lock a planetary rocking member of the first planetary gear mechanism in such a condition that rotational driving force of the motor is transmitted to the transportation roller through the second planet gear. The locking mechanism terminates locking of the planetary rocking member of the first planetary gear mechanism by engaging with the sheet in the transportation path downstream of the transportation roller with respect to the direction in which the sheet is transported.

First, basic operation of the above-described sheet transporting device will be described.

Rotational driving force of the motor is transmitted to the transportation roller through the first rotation-transmitting mechanism that has the first planetary gear mechanism and the locking mechanism. When the planetary rocking member of the first planetary gear mechanism is not locked by the locking mechanism, the transportation roller is rotated in the forward direction by rotation of the motor, regardless of the direction of rotation of the motor. Meanwhile, rotational driving force of the motor is transmitted to the discharge roller through the second rotation-transmitting mechanism. That is, the discharge roller is rotated either in the forward direction or in the reverse direction by rotation of the motor, depending on the direction of rotation of the motor.

First, the motor is rotated in the first direction, and both of the transportation roller and the discharge roller rotate in the forward direction. Therefore, the sheet is transported to the transportation path by rotation of the transportation roller in the forward direction, reaches the discharge roller, and is advanced in the direction of discharge by rotation of the discharge roller in the forward direction. For example, if a reading unit of an image reading apparatus is disposed in the transportation path, one side (the front side) of the sheet transported through the transportation path can be read.

Then, when the rear end of the sheet comes to a position immediately before the discharge roller, the direction of rotation of the motor is reversed and the motor is rotated in the second direction. As a result, the discharge roller rotates in the reverse direction, while the transportation roller continues to rotate in the forward direction. Therefore, the sheet that has been turned upside down is fed to the transportation roller through the reversing path with its rear end first by rotation of the discharge roller in the reverse direction, and is transported to the transportation path for a second time by rotation of the transportation roller in the forward direction. At this time, the other side (the back side) of the sheet can be read by the reading unit of the image reading apparatus, which is disposed in the transportation path, for example.

Then, the direction of rotation of the motor is again reversed and the motor is rotated in the first direction after the rear end of the sheet fed to the reversing path passes the discharge roller and before the forward end of the sheet in the transportation path reaches the discharge roller. As a result, the transportation roller continues to rotate in the forward direction, and also the discharge roller rotates in the forward direction. Therefore, the sheet is transported to the transportation path by rotation of the transportation roller in the forward direction, reaches the discharge roller, and is discharged by rotation of the discharge roller in the forward direction. The motor continues to be rotated in the first direction until the rear end of the sheet passes the discharge roller, thereby completely discharging the sheet.

Next, skew-removing operation for the sheet in the above-described sheet transporting device will be described.

Skew-removing operation for the sheet can be performed in the following manner, before the sheet is transported to the transportation path by rotation of the transportation roller in the forward direction, and before the sheet that has been turned upside down is again transported to the transportation path.

First, before the sheet begins to be transported by rotation of the transportation roller, the planetary rocking member of the first planetary gear mechanism is locked by the locking mechanism in such a condition that rotational driving force of the motor is transmitted to the transportation roller through the second planet gear. In this condition, the transportation roller rotates either in the forward direction or in the reverse direction, depending on the direction of rotation of the motor. That is, the transportation roller can be rotated in the reverse direction. Thus, before starting to transport the sheet by rotation, the transportation roller can perform skew-removing operation by nipping and ejecting the sheet. Then, after the skew-removing operation for the sheet, the locking of the planetary rocking member of the first planetary gear mechanism by the locking mechanism is terminated so that the above-described basic operation of the sheet transporting device is not inhibited by the locking mechanism.

Moreover, in the above-described sheet transporting device, the locking of the planetary rocking member of the first planetary gear mechanism by the locking mechanism can be terminated by using the sheet that is transported to the transportation path after the skew-removing operation. Therefore, it is not necessary to provide another source of driving force or the like in order to terminate locking of the planetary rocking member of the first planetary gear mechanism by the locking mechanism.

Thus, according to this aspect of the invention, a sheet transporting device capable of automatically reversing a sheet and capable of performing skew-removing operation for the sheet can be provided by using a single motor as the source of driving force. Therefore, an advantage of this aspect of the invention is that a sheet transporting device capable of automatically reversing a sheet can be provided at low cost.

Preferably, in the above-described sheet transporting device, when the planetary rocking member of the first planetary gear mechanism rocks and moves to such a position that rotational driving force of the motor is transmitted to the transportation roller through the second planet gear, the planetary rocking member of the first planetary gear mechanism is locked by the locking mechanism in the position.

In this configuration, since the locking mechanism can be operated by using rocking of the planetary rocking member of the first planetary gear mechanism that is caused by rotation of the motor, it is not necessary to provide another source of driving force or the like in order to operate the locking mechanism. Thus, a sheet transporting device capable of automatically reversing a sheet can be provided at lower cost.

Preferably, the above-described sheet transporting device further includes a feed roller that feeds a sheet from a sheet placement section to the transportation roller by rotating in a forward direction; and a third rotation-transmitting mechanism that transmits rotational driving force of the motor to the feed roller. The third rotation-transmitting mechanism includes a second planetary gear mechanism and a restricting mechanism. The second planetary gear mechanism transmits rotational driving force of the motor to the feed roller. The restricting mechanism can restrict rocking of a planetary rocking member of the second planetary gear mechanism so as to at least prevent the feed roller from rotating in the forward direction.

The third rotation-transmitting mechanism, which transmits rotational driving force of the motor to the feed roller, can be held by the restricting mechanism in such a condition that the feed roller does not rotate in the forward direction. In this condition, sheets are not fed to the transportation roller regardless of the state of rotation or the direction of rotation of the motor. After the transported sheet is discharged by the discharge roller, restriction of rocking of the planetary rocking member of the second planetary gear mechanism by the restricting mechanism can be terminated so that the feed roller can be rotated in the forward direction to feed the next sheet. That is, in the sheet transporting device capable of automatically reversing a sheet, all of the transportation roller, the discharge roller, and the feed roller can be driven by a single motor. Therefore, a sheet transporting device capable of automatically feeding a plurality of sheets in succession and capable of automatically reversing a sheet can be provided at low cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Configuration of Automatic Document Feeder

First, a configuration of an automatic document feeder which is the sheet transporting device of an embodiment of the invention will be described with reference to FIGS. 1 to 3.

Figure 1:
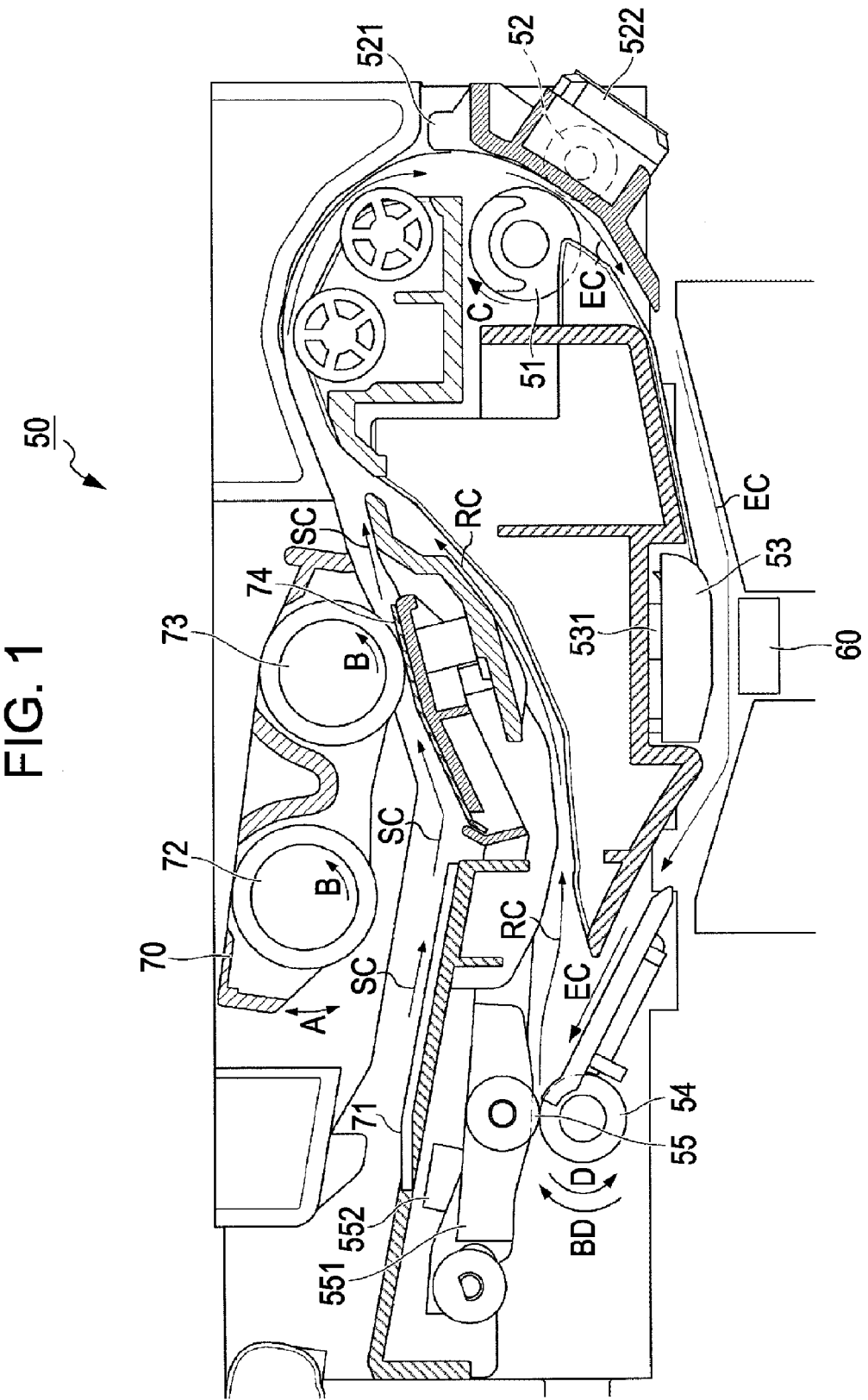
FIG. 1 is a side sectional view showing main parts of an automatic document feeder.

FIG. 1 is a side sectional view of main parts of an automatic document feeder.

To feed sheets such as document sheets, an automatic document feeder 50 has a sheet placement section 71, two feed rollers 72 and 73, and a separation section 74. A plurality of sheets that are to be fed can be stacked on the sheet placement section 71. The feed rollers 72 and 73 are rotatably supported by a feed roller holder 70 that is rockable in the directions indicated by reference numeral A. Rotational driving force of a motor is transmitted to the feed rollers 72 and 73 to cause them to rotate. The separation section 74 is provided to separate sheets, and includes a known separation pad. The uppermost one of the plurality of sheets stacked on the placement section 71 is fed through a feed path SC by rotation of the feed rollers 72 and 73 in forward directions B. At this time, the sheet to be fed is separated from other sheets by the separation section 74 so as not to be fed together with other sheets.

The automatic document feeder 50 has a transportation roller 51 and a transportation driven roller 52 to transport a sheet to a transportation path EC. Rotational driving force of the motor is transmitted to the transportation roller 51 to cause it to rotate. The transportation driven roller 52 is supported by a transportation driven roller holder 521 and can rotate by being driven by the transportation roller 51. The transportation driven roller holder 521 is displaceable, and urged by resilient force of a spring 522 in the direction in which the transportation driven roller 52 abuts the transportation roller 51. The sheet that is fed is nipped between the transportation roller 51 and the transportation driven roller 52 while the transportation roller 51 rotates in a forward direction C, thereby transporting the sheet to the transportation path EC.

A sheet supporting section 53 is disposed in the transportation path EC. An image reading section 60 of an image reading apparatus (a copier, a facsimile, a scanner or the like) is disposed opposite the sheet supporting section 53. The sheet supporting section 53 is urged by a spring 531 toward the image reading section 60. The sheet being transported in the transportation path EC is supported by the sheet supporting section 53 while the side of the sheet that faces the image reading section 60 is read by the image reading section 60.

The automatic document feeder 50 has a discharge roller 54 and a discharge driven roller 55 to discharge the sheet in the transportation path EC, and to feed the sheet to the transportation roller 51 through a reversing path RC. Rotational driving force of the motor is transmitted to the discharge roller 54 to cause it to rotate. The discharge driven roller 55 is supported by a discharge driven roller holder 551 and can rotate by being driven by the discharge roller 54. The discharge driven roller holder 551 is displaceable, and urged by resilient force of a spring 552 in the direction in which the discharge driven roller 55 abuts the discharge roller 54.

When the sheet in the transportation path EC is nipped between the discharge roller 54 and the discharge driven roller 55, the sheet can be discharged from the automatic document feeder 50 by rotation of the discharge roller 54 in a forward direction D. If the discharge roller 54 is rotated in a reverse direction BD when the sheet has not yet been discharged, the sheet can be fed to the reversing path RC with its rear end first. More specifically, after the rear end of the sheet nipped between the discharge roller 54 and the discharge driven roller 55 passes the transportation path EC, the rear end is supported at such an angle that it can enter the reversing path RC, because of the arrangement of the discharge roller 54 and the discharge driven roller 55. Therefore, if the discharge roller 54 is rotated in the reverse direction BD from this state, the sheet can be fed to the reversing path RC with its rear end first. Then, the sheet is fed through the reversing path RC to the transportation roller 51, and at this time the sheet has been turned upside down.

A guiding member such as a flap may be rockably provided at the portion where the path branches into the transportation path EC and the reversing path RC.

Figure 2:
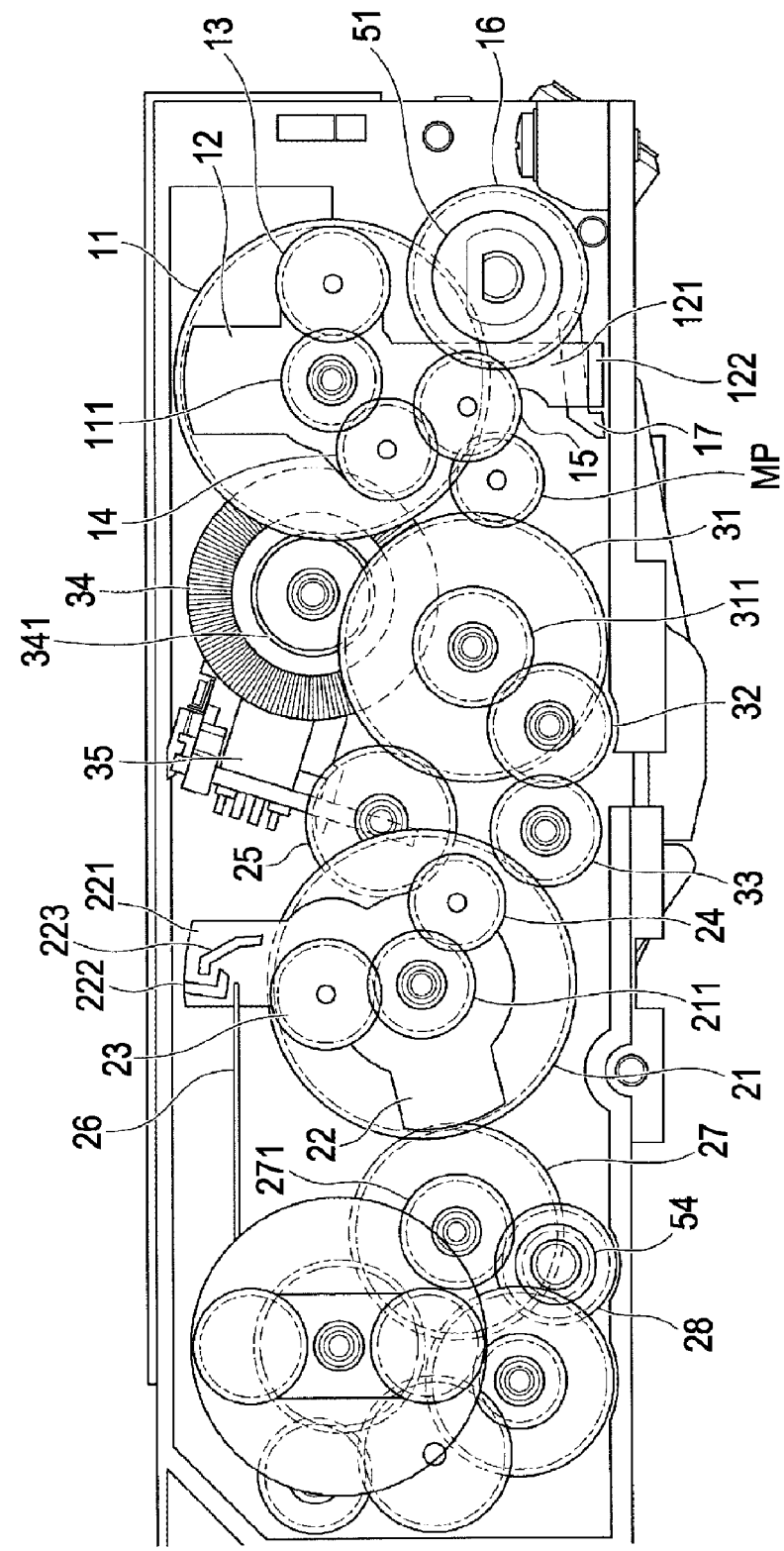
FIG. 2 is a side view showing main parts of driving-force-transmitting mechanisms of the automatic document feeder.

FIG. 2 is a side view showing main parts of driving-force-transmitting mechanisms of the automatic document feeder 50. FIG. 3 is a side view in which the driving-force-transmitting mechanisms shown in FIG. 2 are superposed on the side sectional view of FIG. 1 in a see-through way.

In the automatic document feeder 50, rotational driving force is transmitted from a driving pulley MP of the motor to the feed rollers 72 and 73, the transportation roller 51, and the discharge roller 54. The motor serves as a common source of driving force for these rollers.

The automatic document feeder 50 has a first rotation-transmitting mechanism that transmits rotational driving force of the motor to the transportation roller 51. The first rotation-transmitting mechanism includes a first sun gear 11, a first planetary rocking member 12, a first planet gear 13, a second planet gear 14, an idler gear 15, a gear 16, and a locking member 17.

The first sun gear 11 meshes with the driving pulley MP. The first planetary rocking member 12 is rockably supported by the rotating shaft of the first sun gear 11. The first planet gear 13 and the second planet gear 14 are rotatably mounted on the first planetary rocking member 12, and mesh with a gear portion 111 that is integrally formed on the first sun gear 11. These members constitute a first planetary gear mechanism. The gear 16 is integrally provided on the rotating shaft of the transportation roller 51. Rotation of the driving pulley MP of the motor is transmitted to the transportation roller 51, either by the meshing of the first planet gear 13 with the gear 16, or by the meshing of the second planet gear 14 with the idler gear 15 which meshes with the gear 16, depending on the direction of rotation of the motor. That is, rotation of the motor in either direction causes the transportation roller 51 to rotate in the forward direction C when the first planetary rocking member 12 is not locked by a locking mechanism, which will be described in the next paragraph.

The locking member 17, which constitutes the locking mechanism, is rockably supported. The locking member 17 is disposed such that it can engage a convex portion 122 of an arm portion 121 of the first planetary rocking member 12. When the locking member 17 is in engagement with the convex portion 122 of the first planetary rocking member 12, the first planetary rocking member 12 is held in such a position that the second planet gear 14 meshes with the idler gear 15 that meshes with the gear 16. In this state, rotational driving force of the motor is transmitted from the second planet gear 14 via the idler gear 15 to the transportation 51, regardless of the direction of rotation of the driving pulley MP of the motor. A lever portion 171 of the locking member 17 protrudes into the transportation path EC. The sheet transported to the transportation path EC pushes the lever portion 171 and rocks the locking member 17, thereby releasing the first planetary rocking member 12 from the locking by the locking member 17.

The automatic document feeder 50 has a second rotation-transmitting mechanism that transmits rotational driving force of the motor to the discharge roller 54. The second rotation-transmitting mechanism includes gears 21, 27, 28, and 31 to 33.

The driving pulley MP of the motor meshes with the gear 31. A gear portion 311 is formed integrally on the gear 31 and meshes with the gear 32. The gear 32 meshes with the gear 33. The gear 33 meshes with the gear 21. The gear 21 meshes with the gear 27. A gear portion 271 is formed integrally on the gear 27, and meshes with the gear 28, which is formed integrally on the rotating shaft of the discharge roller 54. That is, rotation of the driving pulley MP of the motor is transmitted to the discharge roller 54 via the gears 31 to 33, 21, 27, and 28. Therefore, the discharge roller 54 rotates either in the forward direction D or in the reverse direction BD, depending on the direction of rotation of the motor.

The automatic document feeder 50 has a third rotation-transmitting mechanism that transmits rotational driving force of the motor to the feed rollers 72 and 73. The third rotation-transmitting mechanism includes the aforementioned gears 21 and 31 to 33, a second planetary rocking member 22, a third planet gear 23, a fourth planet gear 24, a gear 25, and a restricting member 26.

In the third rotation-transmitting mechanism, the gear 21 serves as a sun gear (hereinafter referred to as a second sun gear 21). The second planetary rocking member 22 is rockably supported by the rotating shaft of the second sun gear 21. The third planet gear 23 and the fourth planet gear 24 mesh with a gear portion 211 that is integrally formed on the second sun gear 21, and are rotatably supported by the second planetary rocking member 22. These members constitute a planetary gear mechanism (the second planetary gear mechanism). The gear 25 transmits rotation to the feed rollers 72 and 73. Rotation of the driving pulley MP of the motor is transmitted to the feed rollers 72 and 73 by the meshing of the third planet gear 23 or the fourth planet gear 24 with the gear 25.

The second planetary rocking member 22 has an arm portion 221 that has a first restricting convex portion 222 and a second restricting convex portion 223, which engage with the restricting member 26. The restricting member 26, the first restricting convex portion 222, and the second restricting convex portion 223 constitute a restricting mechanism for the second planetary rocking member 22, which will be described later.

The automatic document feeder 50 is provided with a rotary scale 34 and a rotary scale sensor 35 to detect the direction and the amount of rotation of the motor. The rotary scale 34 and the rotary scale sensor 35 constitute a known rotary encoder. A gear portion 341 is integrally formed on the rotary scale 34 and meshes with the first sun gear 11. Therefore, rotation of the driving pulley MP of the motor is transmitted via the first sun gear 11 to the rotary scale 34, thereby causing it to rotate. A large number of slits are formed in the rotary scale 34 at equal intervals in the circumferential direction, and these slits are detected by the rotary scale sensor 35. Rotation of the motor of the automatic document feeder 50 is controlled on the basis of output signals of the rotary scale sensor 35 by a control unit that includes a micro-computer control circuit (not shown) or the like.

Operation of Automatic Document Feeder

Next, operation of the automatic document feeder 50 will be described with reference to FIGS. 4A to 12.

FIGS. 4A to 9B are side views schematically showing main parts of the automatic document feeder 50, and illustrate sheet feeding operation of the automatic document feeder 50.

Figure 3:
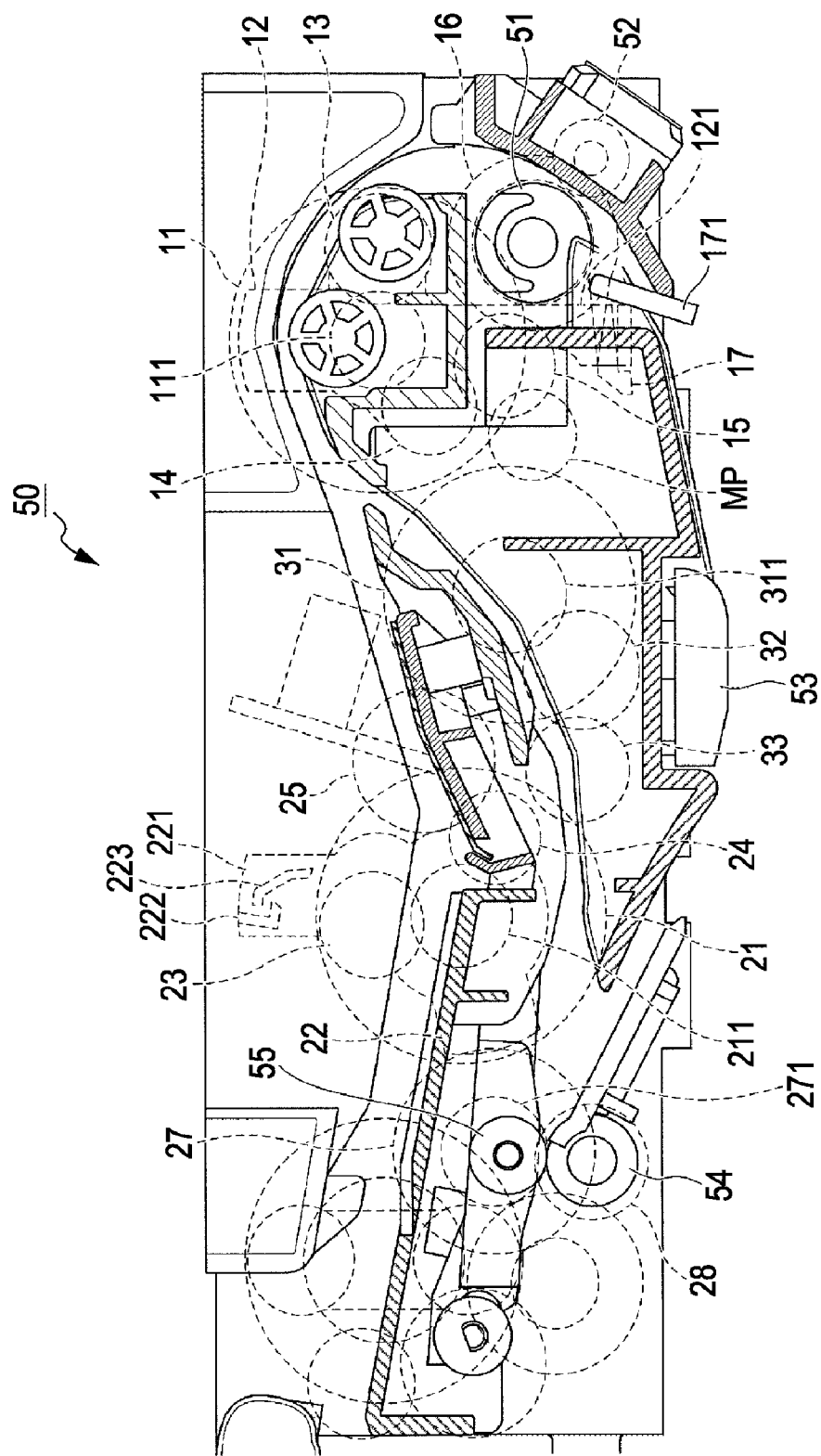
FIG. 3 is a side view in which the driving-force-transmitting mechanisms are superposed on the side sectional view in a see-through way.

In FIGS. 4A to 9B, in order to make the drawings more comprehensible and facilitate understanding of the invention, the configuration of the automatic document feeder 50 is simplified within the scope of the invention by omitting some gears and the like of the automatic document feeder 50 shown in FIGS. 1 to 3.

Figure 4A:
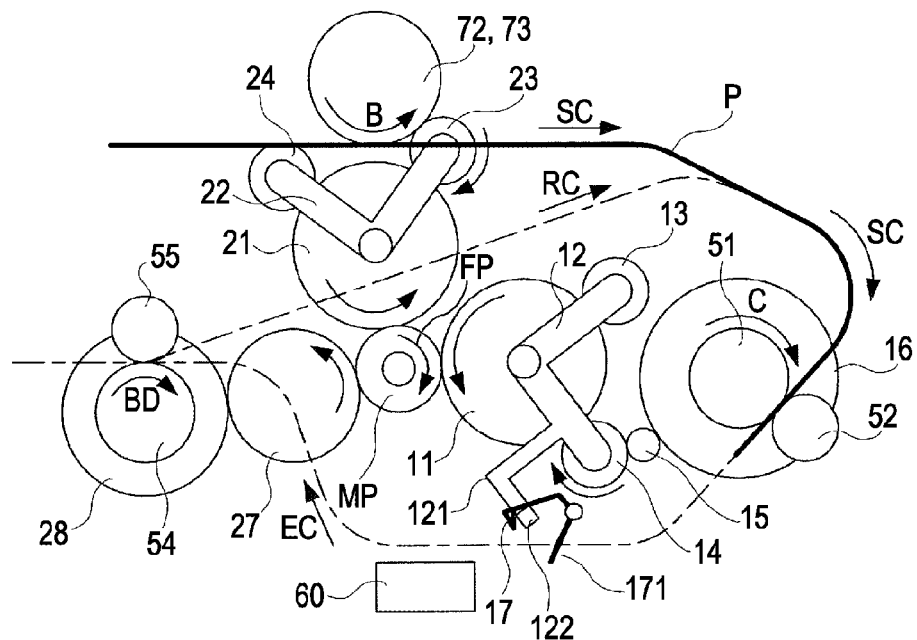
FIG. 4A is a side view schematically showing main parts of the automatic document feeder.

FIG. 4A illustrates a state in which a sheet P is being fed.

First, the driving pulley MP of the motor is rotated in a forward direction FP and the feed rollers 72 and 73 are rotated in a forward direction B. As a result, the sheet P is fed through the feed path SC until the forward end thereof reaches the nip point between the transportation roller 51 and the transportation driven roller 52. Meanwhile, rotation of the motor is transmitted via the second planet gear 14 to the transportation roller 51, and the transportation roller 51 rotates in the forward direction C. At this time, the locking member 17 engages with the convex portion 122 of the first planetary rocking member 12, and the first planetary rocking member 12 is held locked by the locking member 17. More specifically, the convex portion 122 of the first planetary rocking member 12 is caught by a claw portion provided at the tip of the locking member 17. In this state, rotational driving force of the motor is transmitted to the transportation roller 51 via the second planet gear 14 and the idler gear 15, regardless of the direction of rotation of the driving pulley MP of the motor.

Figure 4B:
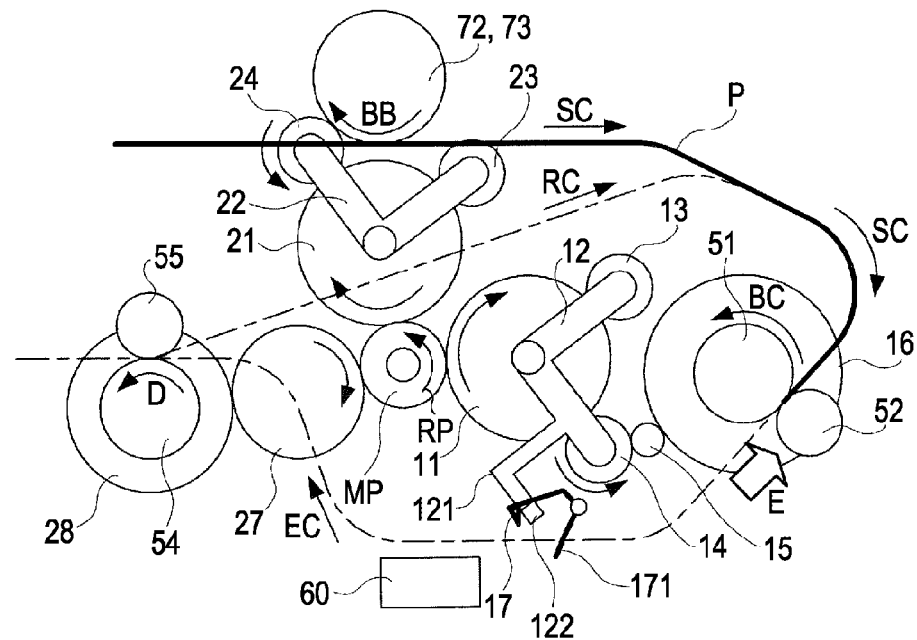
FIG. 4B is a side view schematically showing main parts of the automatic document feeder.

FIG. 4B illustrates a state in which skew-removing operation is being performed for the sheet P that is fed.

In the state, since the first planetary rocking member 12 is locked by the locking member 17, rotational driving force of the motor is transmitted to the transportation roller 51 via the second planet gear 14. That is, the transportation roller 51 rotates either in a forward direction C or in a reverse direction BC, depending on the direction of rotation of the motor. Therefore, when the driving pulley MP of the motor rotates in a reverse direction RP, the transportation roller 51 rotates in the reverse direction BC. Thus, the transportation roller 51 can perform skew-removing operation for the sheet P by nipping and ejecting the sheet P (reference numeral E). More specifically, a portion of the fed sheet P near its forward end is nipped between the transportation roller 51 and the transportation driven roller 52. From this state, the driving pulley MP of the motor is rotated in the reverse direction RP by a certain amount and then rotated in the forward direction FP. This operation is repeated a predetermined number of times.

Moreover, when the transportation roller 51 rotates in the reverse direction BC, the feed rollers 72 and 73 also rotate in a reverse direction BB. Here, a gear that transmits rotation of the motor to the feed roller 72 is provided on the rotating shaft of the feed roller 72, and a certain amount of play in the direction of rotation is provided between the gear and the rotating shaft of the feed roller 72 (the structure will be described in detail later). For this reason, when the direction of rotation of the feed roller 72 changes from the forward direction B to the reverse direction BB, there is a certain delay before the feed roller 72 starts to rotate in the reverse direction BB. This is also true of the feed roller 73. Thus, when the driving pulley MP of the motor rotates in the reverse direction RP, an appropriate degree of looseness occurs in the sheet P between the transportation roller 51 and the feed rollers 72 and 73, because of the delay in rotation of the feed rollers 72 and 73. Thus, skew of the sheet P can be removed properly and reliably by the nip-and-eject operation.

Figure 5A:
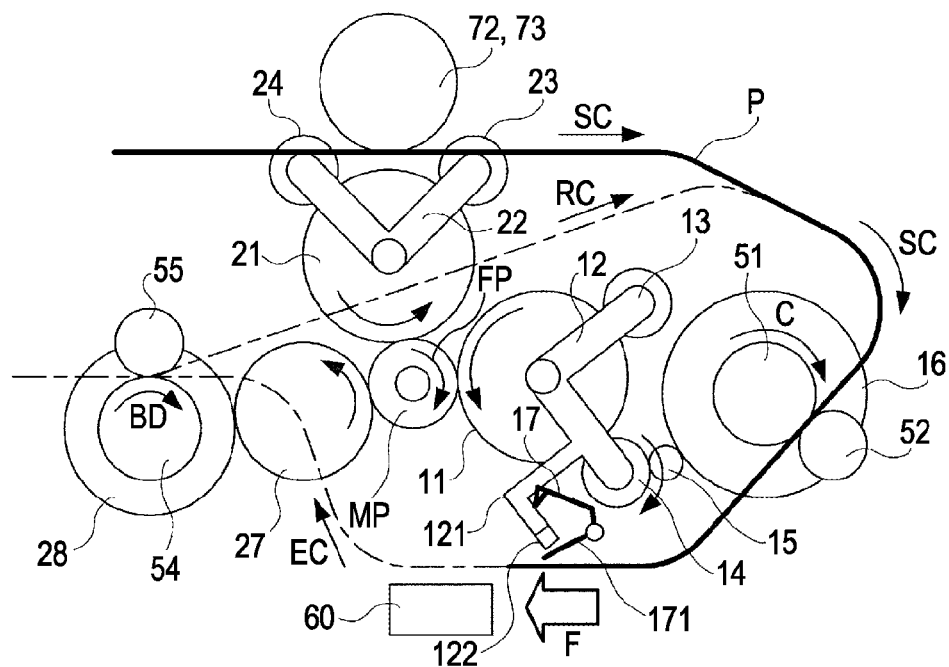
FIG. 5A is a side view schematically showing main parts of the automatic document feeder.

FIG. 5A illustrates a state in which the sheet P after the skew has been removed is being transported to the transportation path EC.

After the skew-removing operation for the sheet P, the driving pulley MP of the motor is rotated in the forward direction FP and the transportation roller 51 is rotated in the forward direction C, thereby transporting the sheet P to the transportation path EC. One side (the front side) of the sheet P transported to the transportation path EC is read by the reading section 60 of the image reading apparatus. Meanwhile, the sheet P transported through the transportation path EC pushes the lever portion 171 of the locking member 17 in the direction indicated by reference numeral F, thereby releasing the locking of the first planetary rocking member 12 by the locking member 17.

Moreover, the rocking of the second planetary rocking member 22 is restricted by a later-described restricting mechanism, so as to at least prevent the feed rollers 72 and 73 from rotating in the forward direction B (prevent the rotation of the motor from being transmitted via the third planet gear 23). Therefore, when the driving pulley MP of the motor rotates in the forward direction FP, rotation of the motor is not transmitted to the feed rollers 72 and 73 from any of the third planet gear 23 and the fourth planet gear 24, and the feed rollers 72 and 73 rotate by being driven by the transportation of the sheet P. This reduces the possibility of great back tension being applied to the sheet P owing to the feed rollers 72 and 73.

Moreover, in order to reduce the back tension applied to the sheet P owing to the feed rollers 72 and 73 as much as possible, it is preferable to provide a release mechanism that can rock the feed roller holder 70 away from the placement section 71. This can prevent the feed rollers 72 and 73 from contacting the sheet P that is transported through the transportation path EC, so that the back tension that is applied to the sheet P owing to the feed rollers 72 and 73 can be further reduced.

When the driving pulley MP of the motor rotates in the forward direction FP, the discharge roller 54 rotates in the reverse direction BD. However, this is acceptable at least until the forward end of the sheet P reaches the nip point between the discharge roller 54 and the discharge driven roller 55.

Figure 5B:
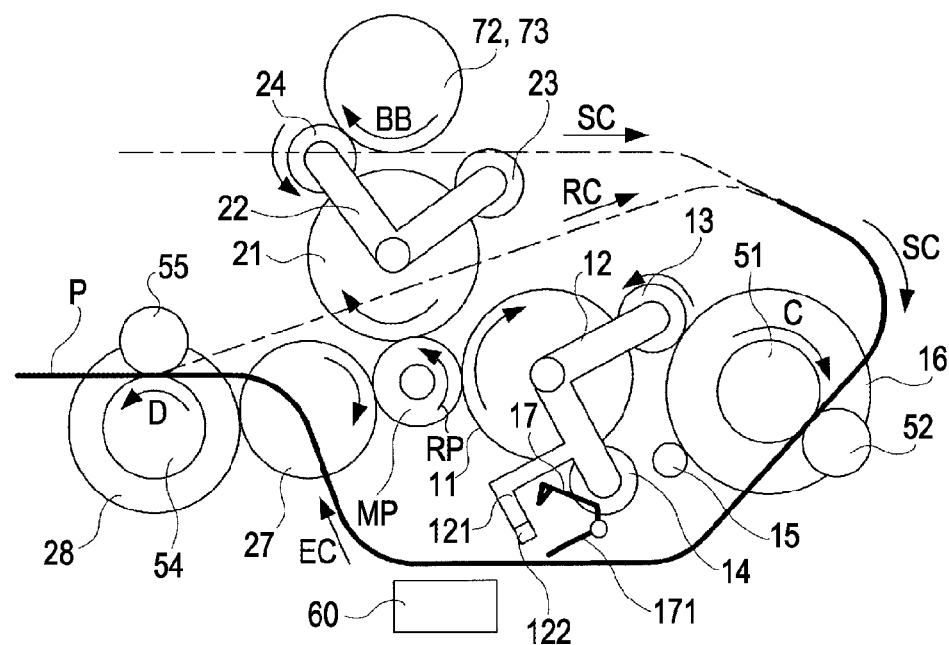
FIG. 5B is a side view schematically showing main parts of the automatic document feeder.

FIG. 5B illustrates a state in which the sheet P in the transportation path EC is being discharged.

While the sheet P is transported through the transportation path EC by rotation of the transportation roller 51 in the forward direction C, the direction of rotation of the driving pulley MP of the motor is changed from the forward direction FP to the reverse direction RP. This change in the direction of rotation of the motor is performed after the locking of the first planetary rocking member 12 by the locking member 17 is released, and by the time the forward end of the sheet P reaches the nip point between the discharge roller 54 and the discharge driven roller 55.

When the driving pulley MP of the motor rotates in the reverse direction RP, the first planetary rocking member 12 rocks in such a direction that the first planet gear 13 meshes with the gear 16, and rotation of the motor is transmitted to the transportation roller 51 via the first planet gear 13. Therefore, the transportation roller 51 continues to rotate in the forward direction C. Moreover, when the driving pulley MP of the motor rotates in the reverse direction RP, the discharge roller 54 rotates in the forward direction D. Thus, the sheet P transported through the transportation path EC is discharged by the discharge roller 54 that rotates in the forward direction D.

At this time, the feed rollers 72 and 73 rotate in the reverse direction BB. Therefore, during the time that the sheet P is being transported, the next sheet is not fed. However, in view of problems that can occur if the feed rollers 72 and 73 rotating in the reverse direction BB contact the sheets stacked on the placement section 71, it is preferable, for example, to provide a release mechanism that can rock the feed roller holder 70 away from the placement section 71, as described above. More specifically, for example, when the feed rollers 72 and 73 rotate in the reverse direction BB, the rotational driving force transmitted to the feed rollers 72 and 73 is used to rock the feed roller holder 70, thereby separating the feed rollers 72 and 73 from the sheets on the placement section 71.

Figure 6A:
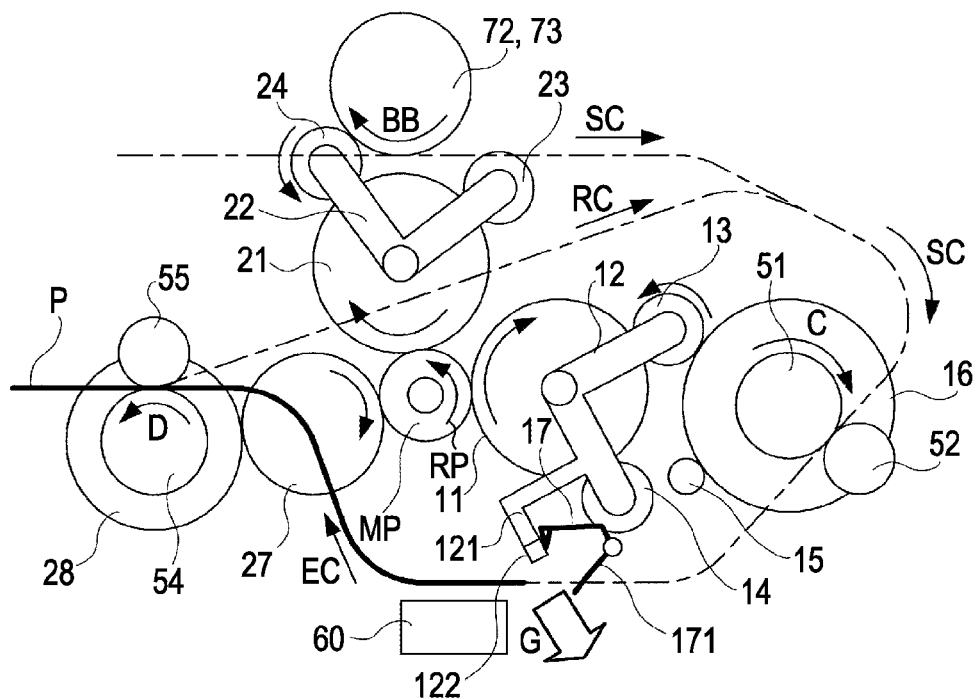
FIG. 6A is a side view schematically showing main parts of the automatic document feeder.

FIG. 6A illustrates a state after the rear end of the sheet P transported through the transportation path EC passes the lever portion 171 of the locking member 17.

When the rear end of the sheet P transported through the transportation path EC passes the lever portion 171 of the locking member 17, the locking member 17 rocks in the direction indicated by reference numeral G. However, when the first planetary rocking member 12 is in the position in which the first planet gear 13 meshes with the gear 16, the locking member 17 does not engage with the convex portion 122 of the first planetary rocking member 12. More specifically, the claw portion provided at the tip of the locking member 17 abuts a side surface of the convex portion 122 of the first planetary rocking member 12.

Figure 6B:
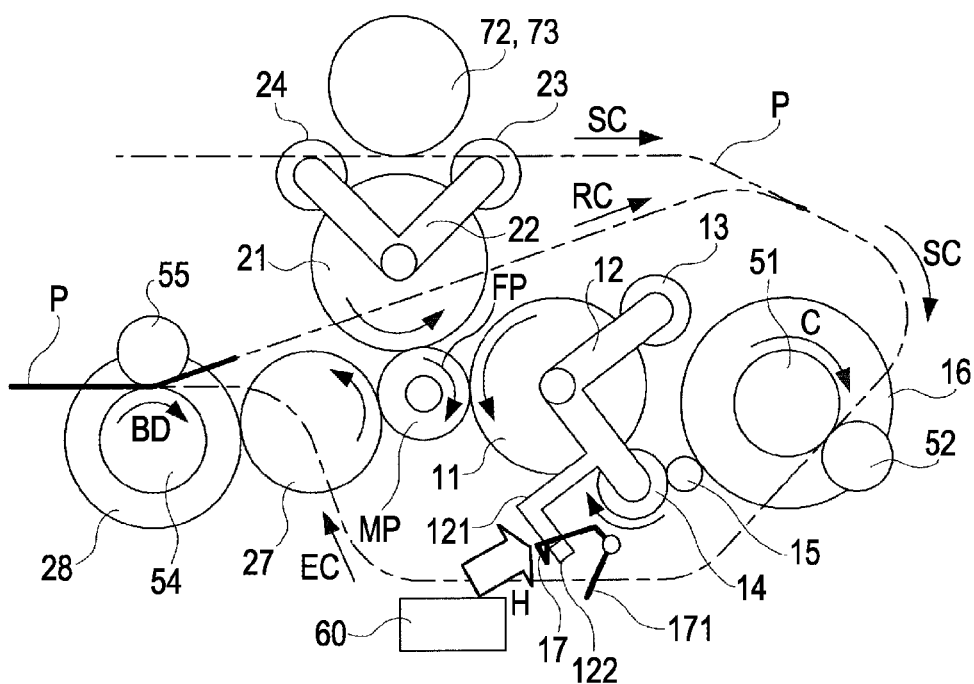
FIG. 6B is a side view schematically showing main parts of the automatic document feeder.

FIG. 6B illustrates a state immediately after the switching-back of the sheet P is started.

When the rear end of the sheet P comes to a position before the discharge roller 54, the direction of rotation of the driving pulley MP of the motor is changed from the reverse direction RP to the forward direction FP. As a result, the discharge roller 54 rotates in the reverse direction BD, and the sheet P is fed to the reversing path RC with its rear end first. Meanwhile, rotation of the driving pulley MP of the motor is transmitted to the transportation roller 51 via the second planet gear 14. In this state, the transportation roller 51 continues to rotate in the forward direction C, and the first planetary rocking member 12 rocks in the direction indicated by reference numeral H, so that the locking member 17 engages with the convex portion 122 of the first planetary rocking member 12 and locks the first planetary rocking member 12 again.

Figure 7A:
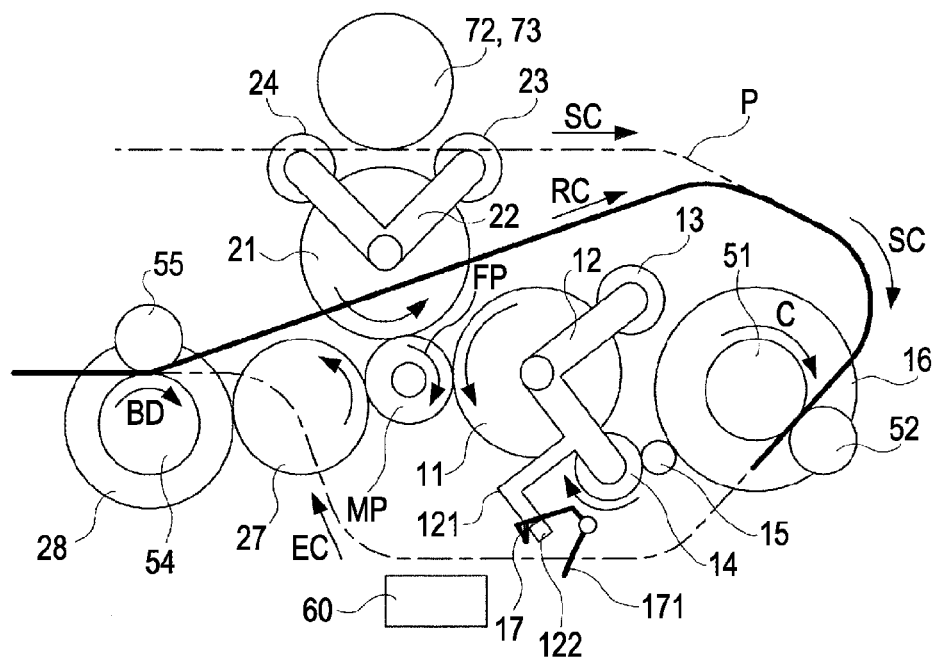
FIG. 7A is a side view schematically showing main parts of the automatic document feeder.

FIG. 7A illustrates a state in which the sheet P is fed to the transportation roller 51 through the reversing path RC.

The discharge roller 54 rotates in the reverse direction BD and thereby the sheet P is transported to the transportation roller 51 through the reversing path RC. The sheet P has been turned upside down owing to the switching-back, and is transported until the forward end thereof (the end that has been referred to as the rear end in the state prior to the switching-back) reaches the nip point between the transportation roller 51 and the transportation driven roller 52.

Figure 7B:
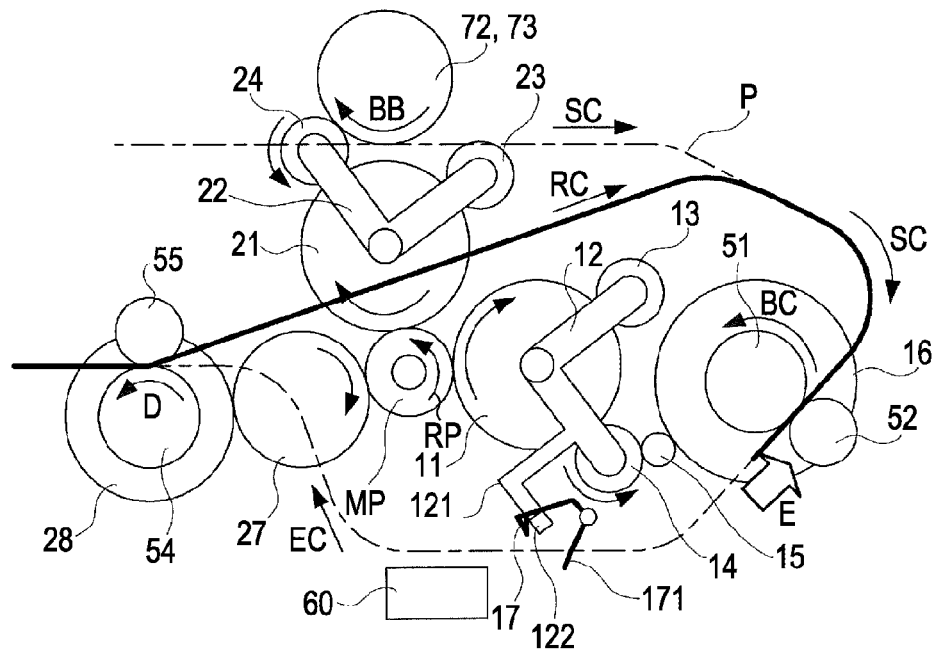
FIG. 7B is a side view schematically showing main parts of the automatic document feeder.

FIG. 7B illustrates a state in which skew-removing operation is performed for the sheet P that has been turned upside down.

In the state, since the first planetary rocking member 12 is locked by the locking member 17, rotation of the motor is transmitted to the transportation roller 51 via the second planet gear 14. Therefore, when the driving pulley MP of the motor rotates in the reverse direction RP, the transportation roller 51 rotates in the reverse direction BC. Moreover, when the driving pulley MP of the motor rotates in the reverse direction RP, the discharge roller 54 rotates in the forward direction D. Thus, the transportation roller 51 can perform skew-removing operation for the sheet P by performing the nip-and-eject operation (reference numeral E). The transportation roller 51 and the discharge roller 54 advance the sheet P at approximately equal rates with rotation of the motor. Therefore, the skew-removing operation for the sheet P by the nip-and-eject operation can be performed properly and reliably.

Figure 8A:
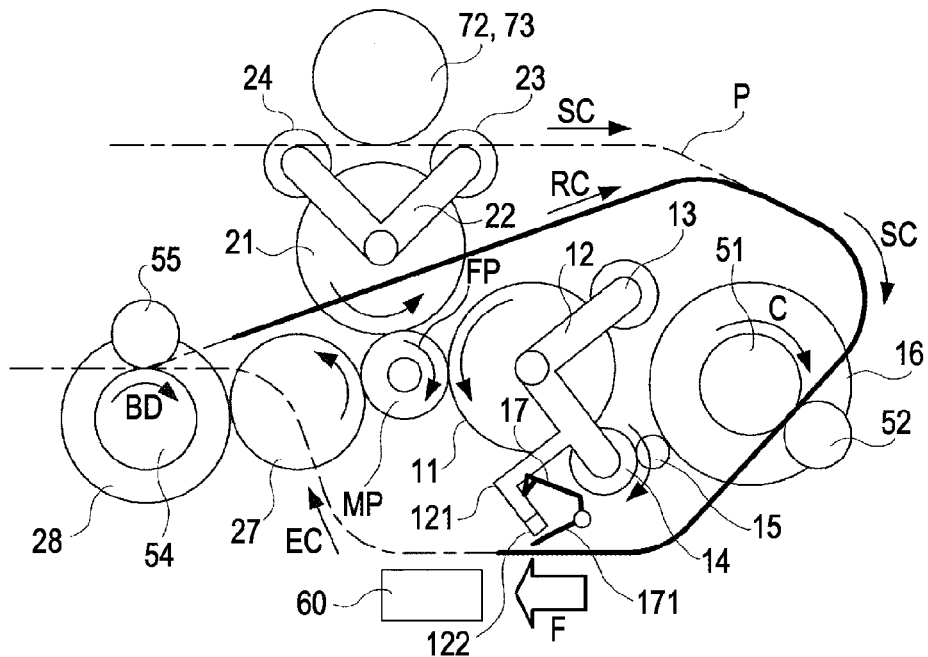
FIG. 8A is a side view schematically showing main parts of the automatic document feeder.

FIG. 8A illustrates a state in which, after the skew is removed, the sheet P that has been turned upside down is being transported to the transportation path EC.

After the skew-removing operation for the sheet P, the driving pulley MP of the motor is rotated in the forward direction FP and the transportation roller 51 rotates in the forward direction C, thereby transporting the sheet P that has been turned upside down to the transportation path EC. Then, the other side (the back side) of the sheet P is read by the reading section 60 of the image reading apparatus. Meanwhile, the sheet P pushes the lever portion 171 of the locking member 17 in the direction indicated by reference numeral F, thereby terminating the locking of the first planetary rocking member 12 by the locking member 17.

Figure 8B:
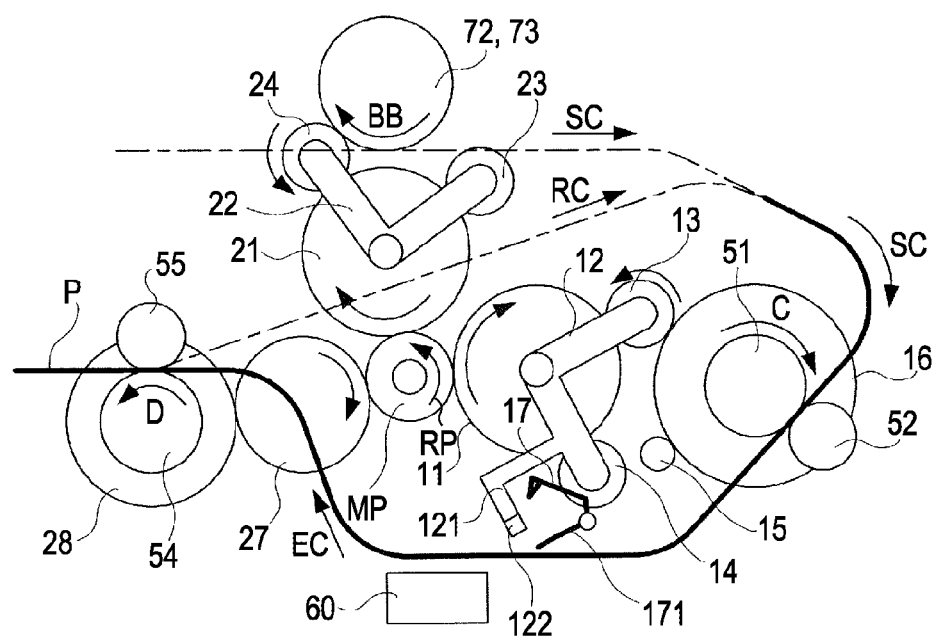
FIG. 8B is a side view schematically showing main parts of the automatic document feeder.

FIG. 8B illustrates a state in which the sheet P that has been turned upside down is being discharged.

While the transportation roller 51 rotates in the forward direction C and thereby the sheet P that has been turned upside down is transported through the transportation path EC, the direction of rotation of the driving pulley MP of the motor is changed from the forward direction FP to the reverse direction RP. This change in the direction of rotation of the motor is performed after the locking of the first planetary rocking member 12 by the locking member 17 is terminated, and by the time the forward end of the sheet P that has been turned upside down reaches the nip point between the discharge roller 54 and the discharge driven roller 55.

When the driving pulley MP of the motor rotates in the reverse direction RP, the first planetary rocking member 12 rocks in such a direction that the first planet gear 13 meshes with the gear 16, so that rotation of the motor is transmitted to the transportation roller 51 via the first planet gear 13. As a result, the transportation roller 51 continues to rotate in the forward direction C. Moreover, when the driving pulley MP of the motor rotates in the reverse direction RP, the discharge roller 54 rotates in the forward direction D. Thus, the sheet P that has been turned upside down is transported through the transportation path EC and discharged by the discharge roller 54 that rotates in the forward direction D.

Here, if the length of the sheet P is greater than the length of the path that extends from the discharge roller 54, through the reversing path RC and the transportation path EC, and back to the discharge roller 54, portions around the forward end and the rear end of the sheet P that has been turned upside down are superposed, and as a result, paper jams or the like may occur. In such cases, it is preferable to provide a release mechanism that can separate the discharge driven roller 55 from the discharge roller 54 by rocking the discharge driven roller holder 551. In this way, the risk of paper jams or the like can be avoided. More specifically, the discharge driven roller 55 is released from the discharge roller 54 before the direction of rotation of the discharge roller 54 is changed from the reverse direction BD to the forward direction D. Then, the releasing of the discharge driven roller 55 is terminated after the rear end of the sheet P that has been turned upside down passes the discharge roller 54.

Figure 9A:
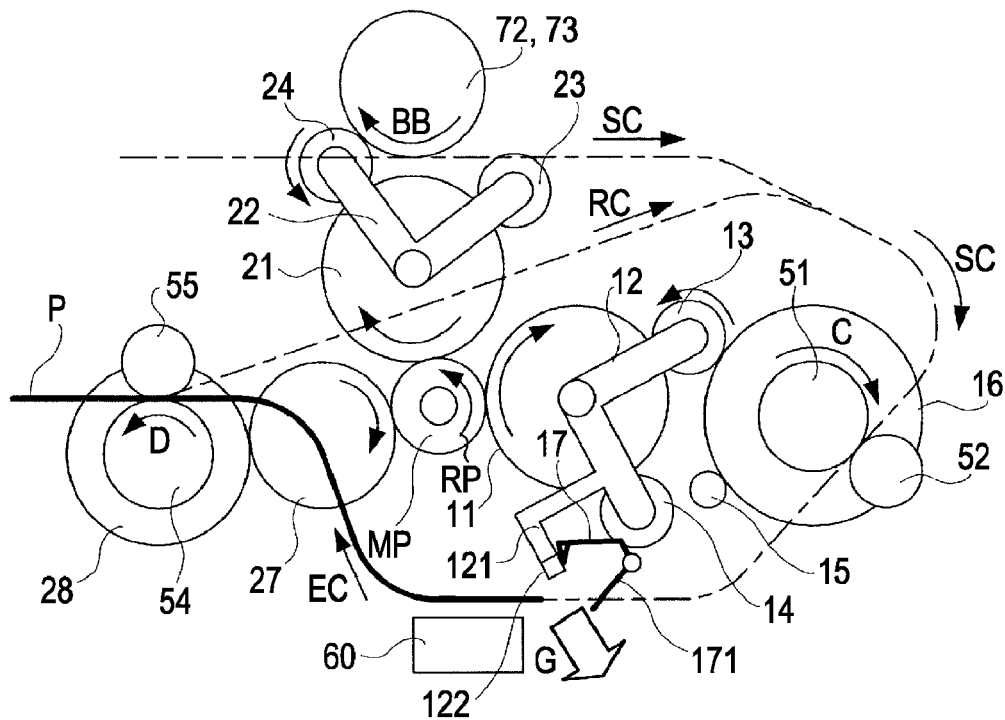
FIG. 9A is a side view schematically showing main parts of the automatic document feeder.

FIG. 9A illustrates a state after the rear end of the sheet P that has been turned upside down and that is transported through the transportation path EC has passed the lever portion 171 of the locking member 17.

When the rear end of the sheet P that has been turned upside down and that is transported through the transportation path EC passes the lever portion 171 of the locking member 17, the locking member 17 rocks in the direction indicated by reference numeral G. As a result, the claw portion provided at the tip of the locking member 17 comes into contact with a side surface of the convex portion 122 of the first planetary rocking member 12. Then, the driving pulley MP of the motor continues to be rotated in the reverse direction RP until the rear end of the sheet P that has been turned upside down passes the discharge roller 54, thereby completely discharging the sheet P that has been turned upside down from the automatic document feeder 50.

Figure 9B:
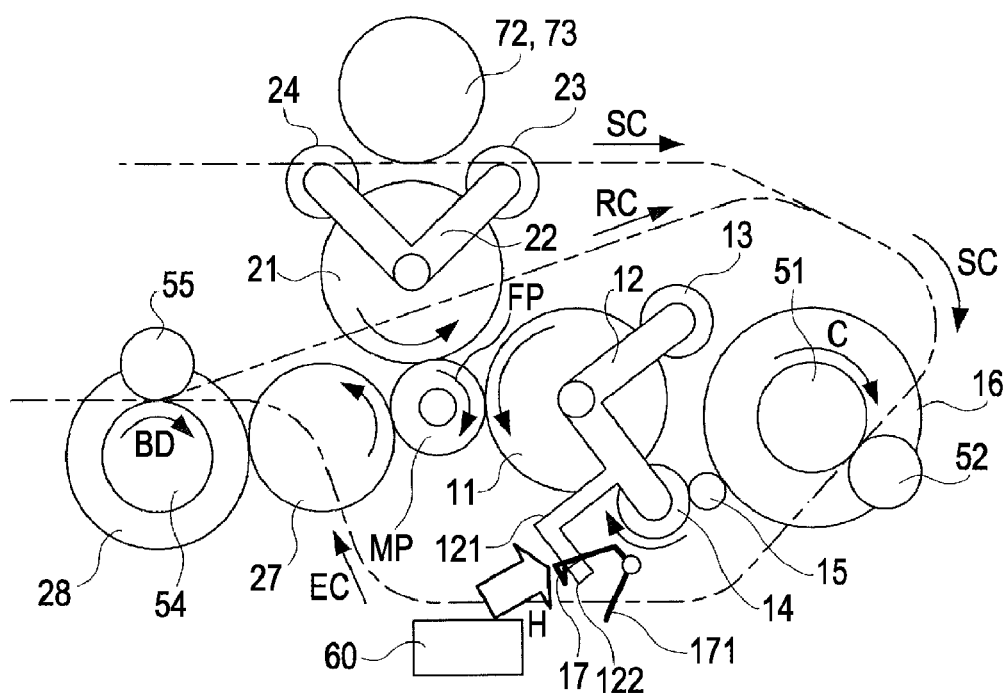
FIG. 9B is a side view schematically showing main parts of the automatic document feeder.

FIG. 9B illustrates a state after the sheet P that has been turned upside down is discharged.

After the sheet P that has been turned upside down is discharged, the driving pulley MP of the motor is rotated in the forward direction FP. As a result, the first planetary rocking member 12 rocks in the direction indicated by reference numeral H, and the locking member 17 engages with the convex portion 122 of the first planetary rocking member 12 and locks the first planetary rocking member 12. At this time, the restriction of rocking of the second planetary rocking member 22 by the restricting mechanism can be canceled by controlling the rotation of the motor in a predetermined manner (the details will be described later). Thus, the next sheet can be fed by rotating the feed rollers 72 and 73 in the forward direction B.

Next, the restricting mechanism that restricts the rocking of the second planetary rocking member 22 will be described with reference to FIGS. 10A to 11B.

FIGS. 10A to 11B are side views schematically showing main parts of the restricting mechanism.

Figure 10A:
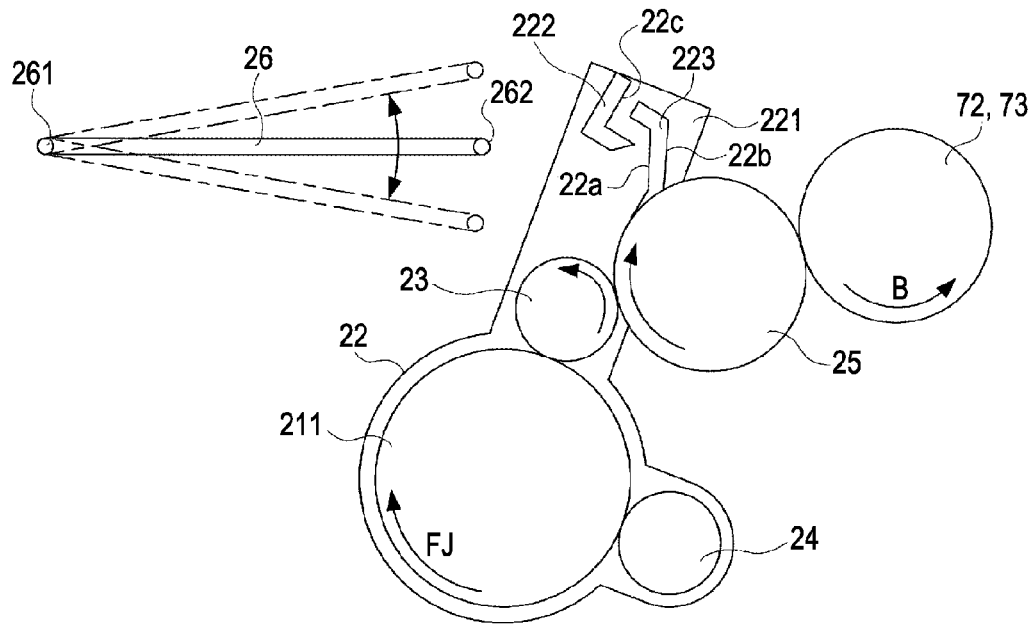
FIG. 10A is a side view schematically showing main parts of a restricting mechanism.

FIG. 10A illustrates a state in which rocking of the second planetary rocking member 22 is not restricted by the restricting mechanism.

The restricting mechanism includes the first restricting convex portion 222 and the second restricting convex portion 223 that are formed on the arm portion 221 of the second planetary rocking member 22, and the restricting member 26. The restricting member 26 is a rod-form member, and is rockably supported at a pivot portion 261 on one end thereof. An engaging portion 262 on the other end engages with the first restricting convex portion 222 and the second restricting convex portion 223. The engaging portion 262 is formed by bending the other end of the restricting member 26 into an L-shape, for example. The restricting member 26 is biased to a predetermined position of rocking by a biasing device (not shown) so that the restricting member 26 is in a substantially horizontal attitude.

Alternatively, for example, the restricting member 26 may be a resiliently deformable rod-form member. The resiliently deformable rod-form member may be fixedly supported at one end thereof in a substantially horizontal attitude, and the engaging portion 262 may be provided at the other end.

When the driving pulley MP of the motor rotates in the forward direction FP while rocking of the second planetary rocking member 22 is not restricted, the second sun gear 21 rotates in the forward direction FJ. As a result, the second planetary rocking member 22 rocks in such a direction that the third planet gear 23, which meshes with the gear portion 211 of the second sun gear 21, meshes with the gear 25. Thus, rotation of the motor is transmitted from the third planet gear 23 via the gear 25 to the feed rollers 72 and 73, and the feed rollers 72 and 73 are rotated in the forward direction B. That is, the sheet P can be fed.

Figure 10B:
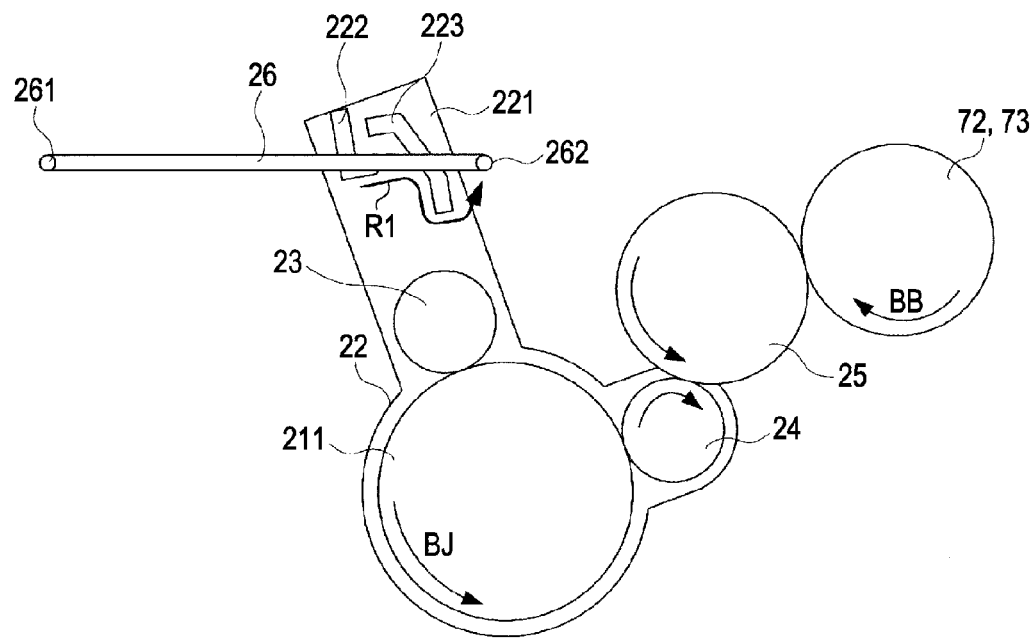
FIG. 10B is a side view schematically showing main parts of the restricting mechanism.

FIG. 10B illustrates a state in which rotation of the motor is transmitted from the fourth planet gear 24 via the gear 25 to the feed rollers 72 and 73.

When the driving pulley MP of the motor is rotated in the reverse direction RP while rocking of the second planetary rocking member 22 is not restricted, the second sun gear 21 rotates in the reverse direction BJ. As a result, the second planetary rocking member 22 rocks in such a direction that the fourth planet gear 24, which meshes with the gear portion 211 of the second sun gear 21, meshes with the gear 25. Thus, rotation of the motor is transmitted from the fourth planet gear 24 via the gear 25 to the feed rollers 72 and 73, and the feed rollers 72 and 73 rotate in the reverse direction BB. Moreover, owing to the rocking of the second planetary rocking member 22, the engaging portion 262 of the restricting member 26 is displaced along a path indicated by reference numeral R1. That is, the engaging portion 262 moves from an inner wall 22a side to an outer wall 22b side of the second restricting convex portion 223 along the contour of the second restricting convex portion 223, while in sliding contact with the second restricting convex portion 223. At this time, the restricting member 26 resiliently rocks in response to the displacement of the engaging portion 262.

Figure 11A:
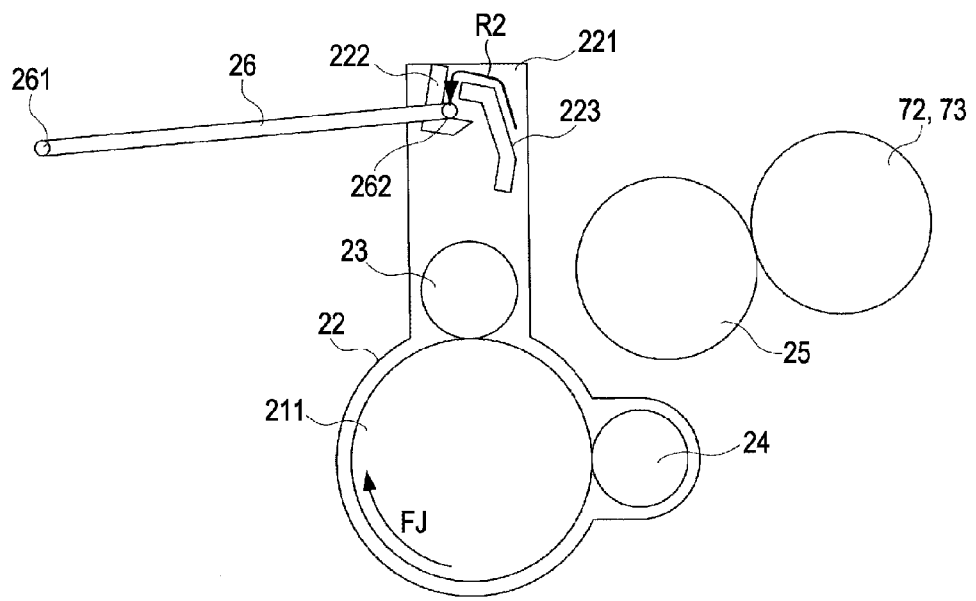
FIG. 11A is a side view schematically showing main parts of the restricting mechanism.

FIG. 11A illustrates a state in which the driving pulley MP of the motor is again rotated in the forward direction FP from the state shown in FIG. 10B.

When the driving pulley MP of the motor is again rotated in the forward direction FP from the state shown in FIG. 10B, the second planetary rocking member 22 rocks in such a direction that the third planet gear 23 meshes with the gear 25. As a result, the engaging portion 262 of the restricting member 26 is displaced along a path indicated by reference numeral R2. That is, the engaging portion 262 moves from the outer wall 22b side of the second restricting convex portion 223 along the contour of the second restricting convex portion 223 and enters between the first restricting convex portion 222 and the second restricting convex portion 223. Thus, the engaging portion 262 comes into contact with an inner wall 22c of the generally L-shaped first restricting convex portion 222. As a result, rocking of the second planetary rocking member 22 is restricted by the restricting member 26, so as to prevent the third planet gear 23 from meshing with the gear 25.

When the driving pulley MP of the motor is rotated in the reverse direction RP from this state, the engaging portion 262 of the restricting member 26 is again displaced along the path indicated by reference numeral R1. That is, the engaging portion 262 again moves from the inner wall 22a side to the outer wall 22b side of the second restricting convex portion 223 along the contour of the second restricting convex portion 223 (FIG. 10B). Then, when the driving pulley MP of the motor is again rotated in the forward direction FP from this state, the engaging portion 262 of the restricting member 26 is again displaced along the path indicated by reference numeral R2. That is, the engaging portion 262 moves from the outer wall 22b side of the second restricting convex portion 223 along the contour of the second restricting convex portion 223, and again comes into contact with the inner wall 22c of the first restricting convex portion 222.

Thus, rocking of the second planetary rocking member 22 continues to be restricted by the restricting member 26 during the time the driving pulley MP of the motor alternately repeats not less than a certain amount of rotation in the forward direction FP and the reverse direction RP.

Figure 11B:
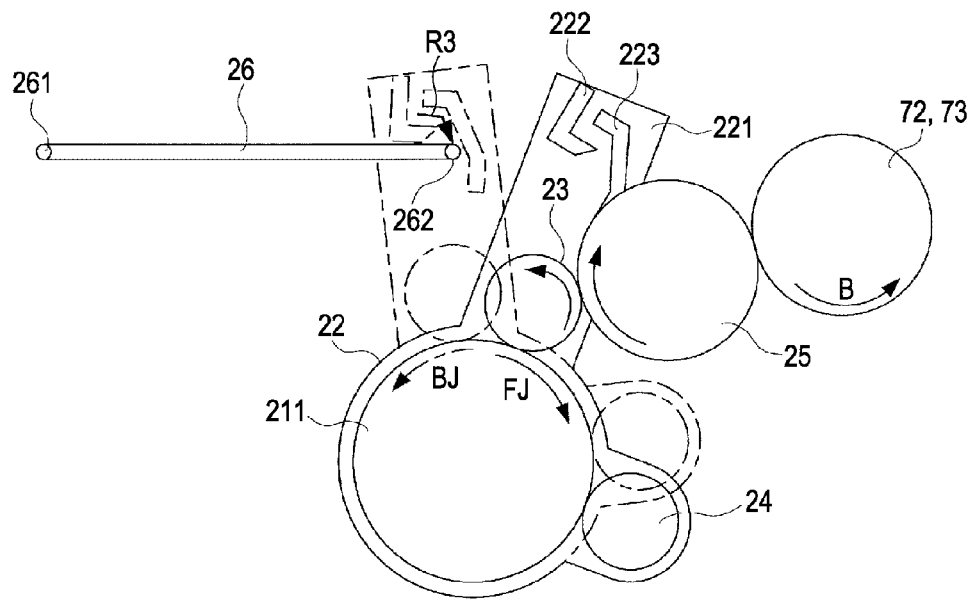
FIG. 11B is a side view schematically showing main parts of the restricting mechanism.

FIG. 11B illustrates operation at the time the restriction of the second planetary rocking member 22 by the restricting member 26 is terminated.

To terminate the restriction of the second planetary rocking member 22 by the restricting member 26, first, the driving pulley MP of the motor is rotated in the reverse direction RP by a predetermined amount. More specifically, after the engaging portion 262 exits the area between the inner wall 22c of the first restricting convex portion 222 and the inner wall 22a of the second restricting convex portion 223 as indicated by reference numeral R3, the rotation of the driving pulley MP in the reverse direction RP is stopped so that the engaging portion 262 does not move to the outer wall 22b side of the second restricting convex portion 223. As a result, the first restricting convex portion 222 and the second restricting convex portion 223 are positioned relative to the restricting member 26 as shown by long-dash-and-short-dash lines in FIG. 11B. When the driving pulley MP of the motor is rotated in the forward direction FP from this state, the restriction of the second planetary rocking member 22 by the restricting member 26 is terminated and the second planetary rocking member 22 can rock to come to the position in which the third planet gear 23 meshes with the gear 25.

Next, the structure in which the rotating shaft of the feed roller 72 engages with the gear that is provided thereon will be described with reference to FIG. 12. The feed roller 73 has a structure similar to that of the feed roller 72, and therefore illustration and description thereof are omitted.

Figure 12:
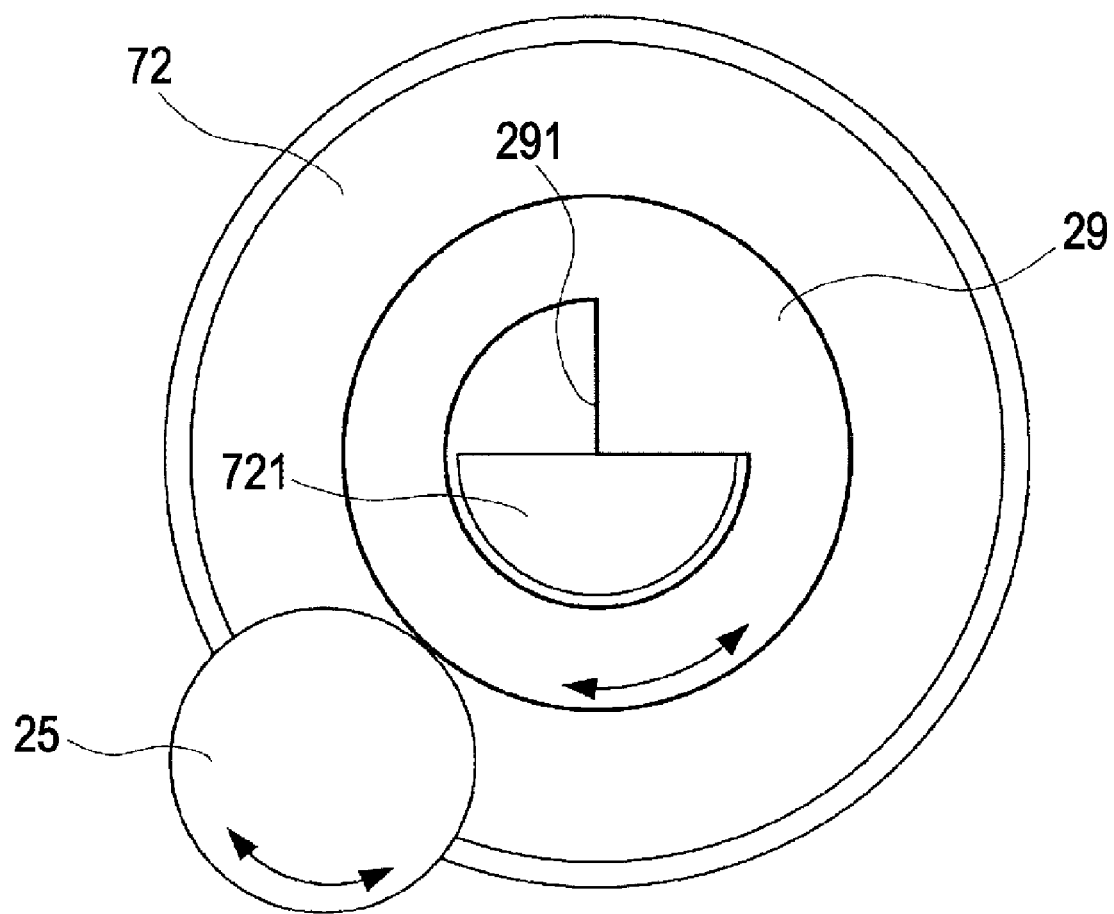
FIG. 12 is a front view schematically illustrating a structure in which a gear engages with the rotating shaft of a feed roller.

FIG. 12 is a front view illustrating the structure in which the rotating shaft of the feed roller 72 engages with the gear that is provided thereon.

A shaft portion 721 having a semicircular section as shown in FIG. 12 is integrally provided on the feed roller 72 and serves as the rotating shaft of the feed roller 72. A gear 29 has a hole 291 in the middle thereof. The hole 291 of the gear 29 is in the form of a circular hole whose one quarter is filled. That is, the hole 291 of the gear 29 is in the form of three quarters of a circle. The shaft portion 721 of the feed roller 72 is inserted through the hole 291 of the gear 29. The gear 29 meshes with the gear 25 that is rotated by rotational driving force transmitted from the motor. Rotational driving force of the motor is transmitted from the gear 25 via the gear 29 to the shaft portion 721 of the feed roller 72, thereby rotating the feed roller 72. When the direction of rotation of the motor is changed, the gear 29 idles for about one quarter of one rotation relative to the shaft portion 721 of the feed roller 72, thereby making a certain delay in rotation.

As described above, the embodiment of the invention can provide the automatic document feeder 50 which is capable of automatically reversing the sheet P, and which can perform skew-removing operation for the sheet P, by using a single motor as the driving source. Therefore, by using the automatic document feeder 50 according to the embodiment of the invention, the automatic document feeder 50 capable of automatically reversing the sheet P can be provided at low cost.

Preferably, as in the above-described embodiment, the automatic document feeder 50 has a configuration in which, when the first planetary rocking member 12 is rocked and moved to such a position that rotational driving force of the motor is transmitted to the transportation roller 51 via the second planet gear 14, the first planetary rocking member 12 is locked and held by the locking member 17. By using this configuration, the rocking of the first planetary rocking member 12 by rotation of the motor is utilized so that locking of the first planetary rocking member 12 by the locking member 17 can be performed automatically. Therefore, it is not necessary to provide another source of driving force or the like for the locking. Thus, the automatic document feeder 50 capable of automatically reversing a sheet can be provided at lower cost.

Preferably, as in the above-described embodiment, the automatic document feeder 50 has a restricting mechanism that can restrict rocking of the second planetary rocking member 22 so as to at least prevent the feed rollers 72 and 73 from rotating in the forward direction B. In this way, in the automatic document feeder 50 capable of automatically reversing a sheet, all of the transportation roller 51, the discharge roller 54, and the feed rollers 72 and 73 can be driven by a single motor. Therefore, the automatic document feeder 50 which is capable of automatically feeding a plurality of sheets P in succession and which is capable of automatically reversing the sheets P can be provided at low cost.

Other Embodiments

The invention is not limited to the above-described embodiment and various modifications are possible within the scope of the invention set forth in the claims. Such modifications are also, of course, within the scope of the invention.

For example, the structure of the automatic document feeder 50 of the above-described embodiment can be applied to recording apparatuses such as printers capable of performing automatic duplex printing. More specifically, in the automatic document feeder 50 of the above-described embodiment, a known recording head, platen, or the like that performs recording on the surface of a recording sheet is disposed in place of the image reading section 60 of the image reading apparatus provided in the transportation path EC. That is, the sheet transporting device of the invention can be implemented also in recording apparatuses such as printers. Even in such embodiments, effects and advantages of the invention can be obtained.

What is claimed is:

1. A sheet transporting device comprising:
   a transportation unit that transports a sheet to a transportation path by rotating in a forward direction;
   a discharge unit that discharges the sheet from the transportation path by rotating in a forward direction, and that feeds the sheet to the transportation unit through a reversing path by rotating in a reverse direction;
   a motor that serves as a source of driving force for a transportation roller and a discharge roller; and
   a first rotation-transmitting mechanism that transmits rotational driving force of the motor to the transportation roller,
   wherein the first rotation-transmitting mechanism includes
   a first planetary gear mechanism that transmits rotational driving force to the transportation unit through a first planet gear to rotate the transportation roller in the forward direction when the motor rotates in a first direction, and that transmits rotational driving force to the transportation unit through a second planet gear to rotate the transportation roller in the forward direction when the motor rotates in a second direction, and
   a locking mechanism that locks a planetary rocking member of the first planetary gear mechanism in such a condition that rotational driving force of the motor is transmitted to the transportation unit through the second planet gear,
   wherein the locking mechanism terminates locking of the planetary rocking member of the first planetary gear mechanism by engaging with the sheet in the transportation path downstream of the transportation roller with respect to a direction in which the sheet is transported.

2. The sheet transporting device according to claim 1, wherein, when the planetary rocking member of the first planetary gear mechanism rocks and moves to such a position that rotational driving force of the motor is transmitted to the transportation unit through the second planet gear, the planetary rocking member of the first planetary gear mechanism is locked by the locking mechanism in the position.

3. The sheet transporting device according to claim 1, further comprising:
   a feed roller that feeds a sheet from a sheet placement section to the transportation unit by rotating in a forward direction; and
   a second rotation-transmitting mechanism that transmits rotational driving force of the motor to a feed unit,
   wherein the second rotation-transmitting mechanism includes
   a second planetary gear mechanism that transmits rotational driving force of the motor to the feed unit, and
   a restricting mechanism that restricts rocking of a planetary rocking member of the second planetary gear mechanism so as to at least prevent the feed roller from rotating in the forward direction.

* * * * *